United States Patent [19]
Inui et al.

[11] Patent Number: 4,927,364
[45] Date of Patent: May 22, 1990

[54] STEERING WHEEL

[75] Inventors: Shuji Inui; Tetsushi Hiramitsu; Toshinori Takahaski; Makoto Tamaki; Mitsuhiro Kikuta; Junichi Mizutani, all of Aichi, Japan

[73] Assignee: Toyoda Gosei Co., Ltd., Nishikasugai, Japan

[21] Appl. No.: 213,294

[22] Filed: Jun. 29, 1988

[30] Foreign Application Priority Data

Jun. 30, 1987 [JP] Japan .................. 62-101568
Jul. 28, 1987 [JP] Japan .................. 62-189669

[51] Int. Cl.$^5$ ...................... H01R 39/02; H01R 39/08
[52] U.S. Cl. ........................................ 439/15; 439/27
[58] Field of Search ................. 439/15, 18, 20, 22, 439/27, 29; 74/492, 484 R, 552

[56] References Cited

U.S. PATENT DOCUMENTS 4,633,731 1/1987 Kurata ..................... 439/15 X
4,702,705 10/1987 Hirano et al. ............ 439/15

Primary Examiner—Eugene F. Desmond
Attorney, Agent, or Firm—Cushman, Darby & Cushman

[57] ABSTRACT

A steering wheel comprising a pair of sun gears set facing each other, each sun gear comprising a wheel portion having an inner surface and a rim portion protruding along the outer circumference of the wheel portion, slip rings mounted on the inner surface of the wheel portions, and contact pins, that make sliding contact with the slip rings on the wheel portions, provided between the sun gears.

24 Claims, 14 Drawing Sheets

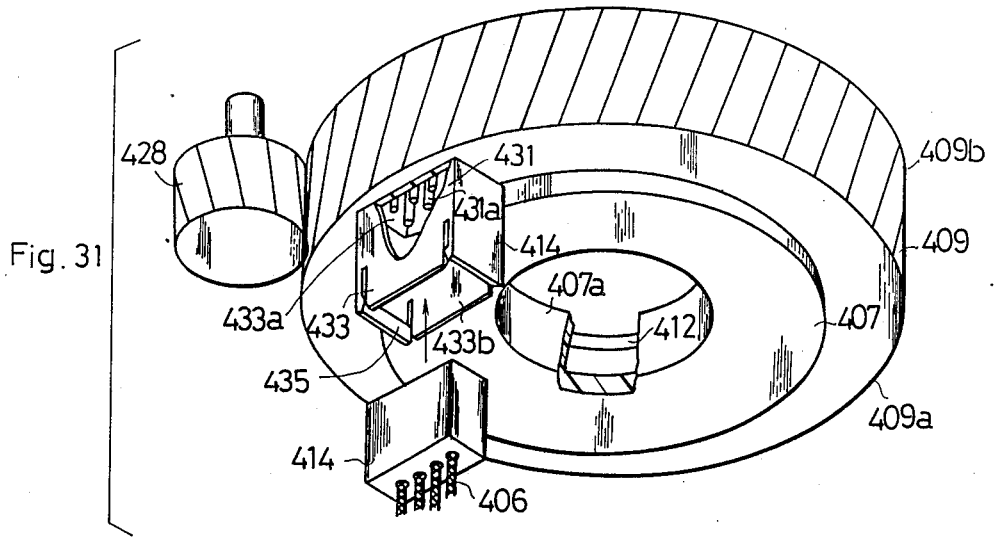
Fig. 31
Fig. 30
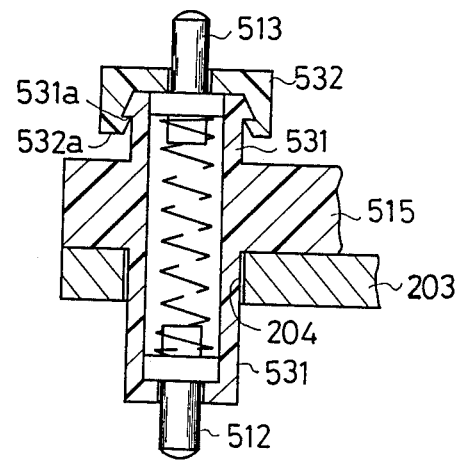
Fig. 32
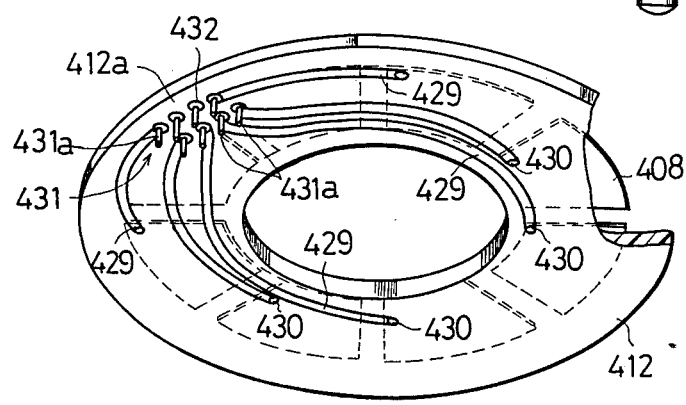

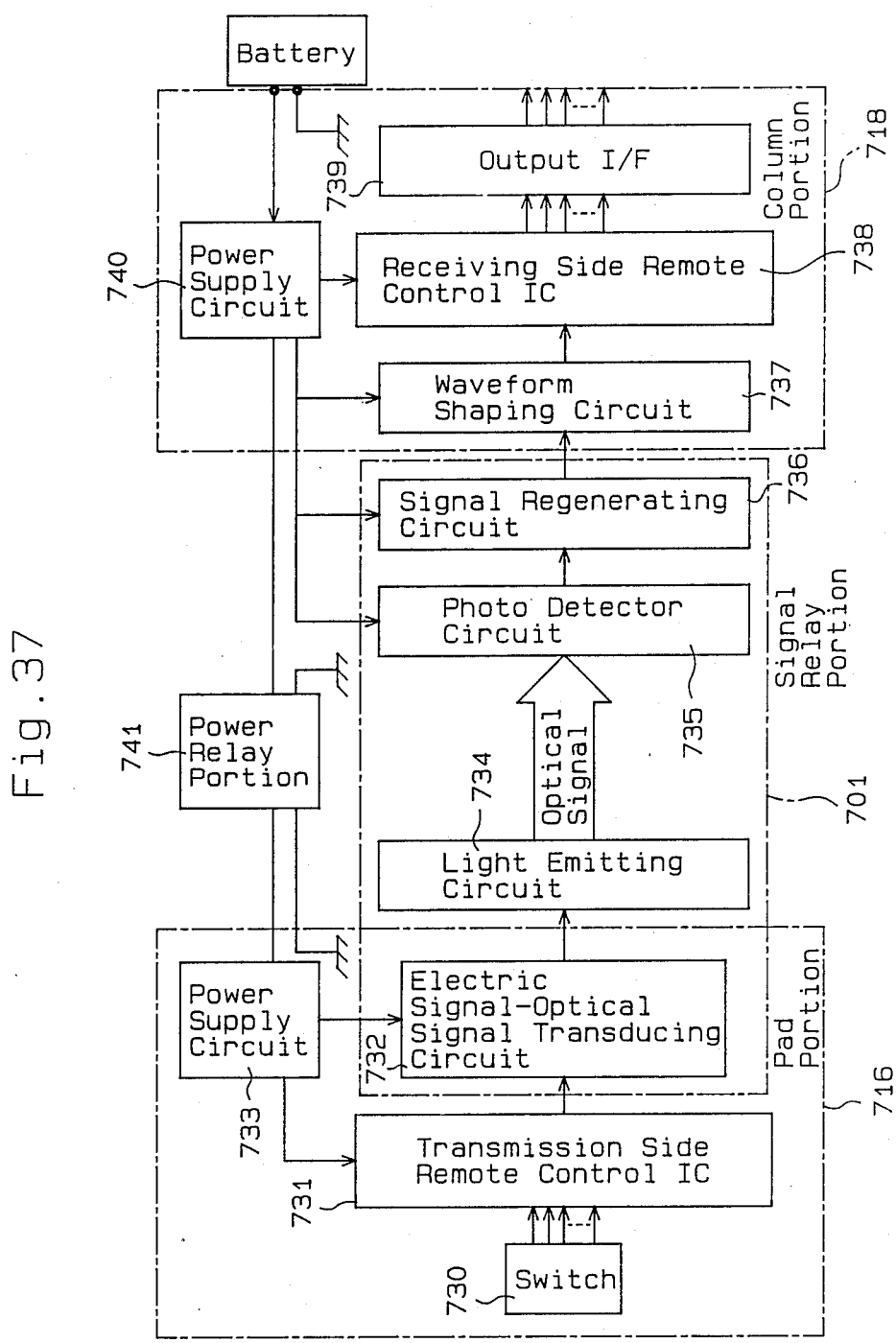

STEERING WHEEL

FIELD OF THE INVENTION

The present invention relates to a steering wheel, in which the planetary gear mechanism, that acts to make the pad portion irrotational, is furnished with a signal circuit relay mechanism, that electrically connects the pad portion and a column portion.

DESCRIPTION OF THE RELATED ART

In recent years, audio equipment for vehicles, a computer for drive or the like tends to be assembled in a car. Also, switches for operating the computer for drive or the like are disposed on a pad portion of a steering wheel.

In this case, there is provided, as a relay mechanism between the pad portion of the steering wheel and a column portion, a multiplex transmission circuit utilizing an optical communication means in which a light emitting element is disposed on the pad portion while a photo detector on the column portion.

In such a relay mechanism, as shown in FIG. 37, a pad portion 716 has provided thereon switches 730, a transmission side remote control IC 731, an electric signal-optical signal transducing circuit 732, and a power supply circuit 733. A signal relay portion 701 includes the above mentioned electric signal-optical signal transducing circuit 732, a light emitting circuit 734, a photo detector circuit 735, a signal regenerating circuit 736. A column portion 718 has disposed thereon a waveform shaping circuit 737, a receiving side remote control IC 738, an output interface 739, and a power supply circuit 740 having a battery. Further, a power relay portion 741 is provided between the pad portion 716 and the column portion 718.

By operating the switches 730 on the pad portion 716, the transmission side remote control IC 731, which is supplied with power from the power supply circuit 733, operates. Next, a plurality of electric signals are transduced into optical signals through the electric signal-optical signal transducing circuit 732. The light emitting circuit 734 emits light signals on the basis of the above light signals. At the same time, the photo detector circuit 735 receives the light signals, and the signal regenerating circuit 736 retransduces them into electric signals. Then, the waveform shaping circuit 737 shapes the electric signals into the original pulse waves. Thereafter, the same pulse waves are transmitted to the output interface 739 through the receiving side remote control IC 738 thereby to actuate electric devices or actuators.

However, the above relay mechanism needs the multiplex transmission circuit with a resultant complicated structure and high production cost.

SUMMARY OF THE INVENTION

An object of the present invention is to provide a steering wheel, which omits a multiplex operation circuit to thereby simplify its structure and to reduce the production cost thereof.

One other object of the present invention is to provide a steering wheel, in which all contact pins come into contact with slip rings with a uniform pressure, and which does not require an installation of an insulated base on a sun gear.

One other object of the present invention is to provide a steering wheel, in which a segmented slip ring can be easily disposed in a fixed position on the sun gear, and in which the slip ring does not deviate from its position on the sun gear during the steering operation.

One other object of the present invention is to provide a steering wheel, in which a plurality of contact pins, that come in contact with the segmented slip rings, can be easily disposed such that their tips are in a single plane.

One other object of the present invention is to provide a steering wheel, in which the process of mounting the contact pins on a boss plate can be performed more efficiently.

One other object of the present invention is to provide a steering wheel, in which signal wires can be easily connected to the segmented slip rings.

In order to realize the objects mentioned above, the present invention comprises a pair of sun gears disposed opposite each other, each sun gear comprising a wheel portion having an inner surface and a rim portion protruding along the outer circumference of the wheel portion, slip rings disposed on the inner surface of the wheel portions, and contact pins, disposed between the pair of sun gears, that make sliding contact with the slip rings on the wheel portions.

Other objects of the present invention will become apparent with an understanding of the embodiments described later, and the appended claims. Further, many advantages not mentioned in this specification will become obvious to one skilled in the art upon application of the present invention.

BRIEF DESCRIPTION OF THE DRAWINGS

FIG. 1 is an exploded perspective view showing main parts of a whole steering wheel, FIG. 2 is a cross sectional view of the steering wheel, FIG. 3 is an exploded perspective view showing the process of mounting a segmented slip ring on the sun gear, FIG. 4 is a partial cross sectional view showing the segmented slip ring on the sun gear, FIG. 5 is an exploded perspective view showing the process of mounting a printed circuit board on the sun gear, FIG. 6 is a partial cross sectional view showing the sun gear installed with the printed circuit board, FIG. 27 is an exploded perspective view showing a contact pin unit, FIG. 28 is a partial cross sectional view of the same, FIG. 30 is a partial cross sectional view showing another example of a contact pin unit, FIG. 31 to FIG. 33 show a fourth embodiment of the present invention, FIG. 31 is an exploded perspective view showing a circumferential region of a sun gear, FIG. 32 is a broken partial perspective view showing an insulated base, FIG. 33 is a partial cross sectional view showing a connector portion, FIG. 37 is a circuit diagram showing a relay mechanism of a related art.

DETAILED DESCRIPTION OF THE PREFERRED EMBODIMENTS

A first embodiment of the present invention is described with reference to FIG. 1 to FIG. 6. In this embodiment, so-called segmented slip rings, that are used as pad and column slip rings, are disposed on two sun gears.

Figure 1:
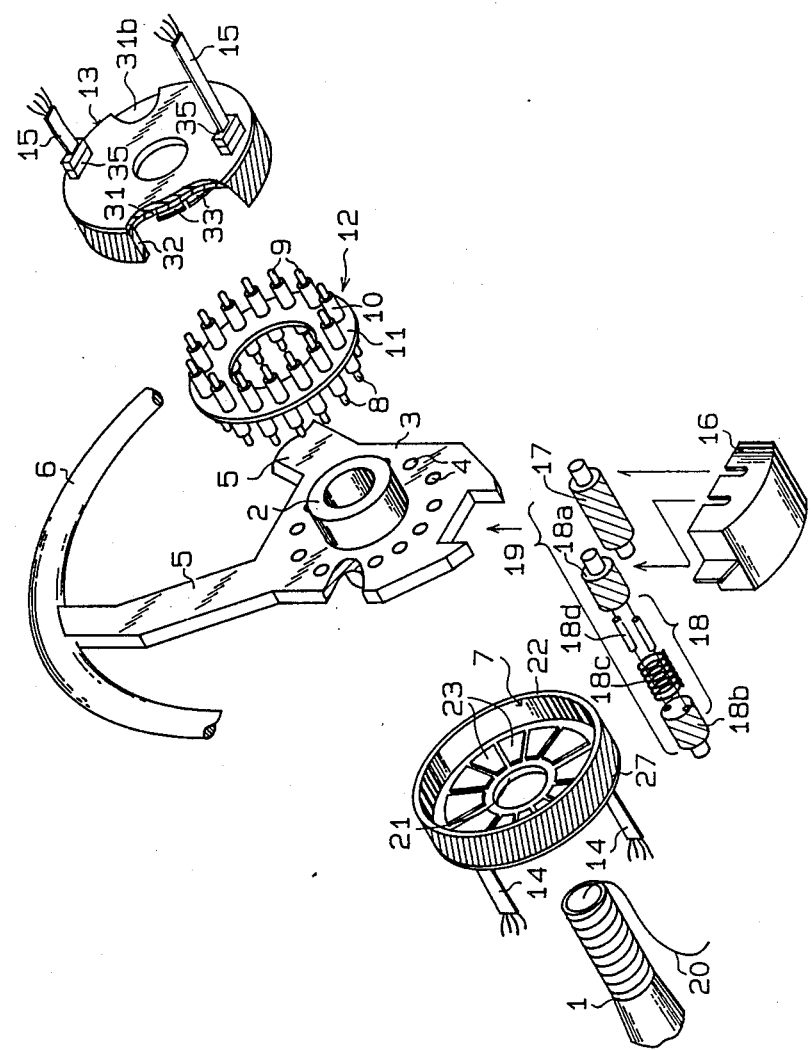
FIG. 1 to FIG. 6 show a first embodiment of the present invention.

As shown in FIG. 1, a boss plate 3 extends outward from the center of a boss portion 2, that is fixed to the end portion of a steering shaft 1. A plurality of insertion holes 4, for inserting contact pin holders to be mentioned later, are perforated on the boss plate 3. A ring portion 6 is supported by two spokes 5 extending outward from the boss plate 3.

A column sun gear 7, that is made of synthetic resin such as polyacetal, polyamide, and others, is pressingly attached to the lower part of the boss portion 2 through bearings 42. It is engaged with a column portion 40, and is always irrotational.

As shown in FIG. 3 to FIG. 6, the column sun gear 7 is a helical gear, formed with an L-shaped cross section in its radial direction, comprising a wheel portion 21 and a rim portion 22. In a state where a surface 21a of the wheel portion 21 (hereinafter referred to as a wheel portion inner surface), on the side of the wheel portion 21 where the rim portion 22 protrudes is opposite the boss plate 3, the column sun gear 7 is attached to the boss portion 2 through the bearings 42.

Twelve fan-shaped column segmented slip rings 23, made of phosphor bronze, is mounted on the wheel portion inner surface 21a, by means of legs 23a. These legs 23a protrude from the lower surface, at the four corners of each segmented slip ring 23, and are inserted into insertion holes 21x provided on the wheel portion 21 (refer to FIG. 3 and FIG. 4).

Further, a printed circuit board 27 that has approximately the same planar configuration as the wheel portion 21 is fixed on a reverse side 21b of the wheel portion inner surface 21a (hereinafter referred to as a wheel portion outer surface), while the legs 23a of the column segmented slip ring 23 are inserted into through-holes 28 provided on the printed circuit board 27. The legs 23a are fixed to the through-holes 28 by soldering (refer to FIG. 5 and FIG. 6).

The ends of the conductive patterns 29, formed on the printed circuit board 27, are connected to the through-holes 28. The other ends of the conductive patterns 29 are connected to a plurality of wire connecting holes 30 provided on the printed circuit board 27. Pins 26, that protrude from a connector 25, are inserted into the wire connecting holes 30. From the connector 25, lead wires 14 extend through the column portion and are connected to an electric device, actuator, or others (not shown) provided in a car body.

Among the through-holes 28, the through-holes 28 near the wire connecting holes 30 can also be used as wire connecting holes 30.

After being mounted on the column sun gear 7, the column segmented slip rings 23 are made flush with insulated portions 21y located between the column segmented slip ring 23 by thermal pressing. This is to prevent the generation of unwanted noise and momentary disconnection of the signal circuit and to prevent the wide variation of the rotational torque of the ring portion 6, by bounding the column contact pins 8 between the boundaries of the insulated portion 21y and the column slip ring 23, when the column contact pins 8 move between them. Recessed portions, corresponding to each column segmented slip ring 23, can also be provided on the wheel portion 21, and the slip ring 23 can be mounted in these recessed portions, making the slip ring 23 flush with the insulated portion 21y.

Figure 2:
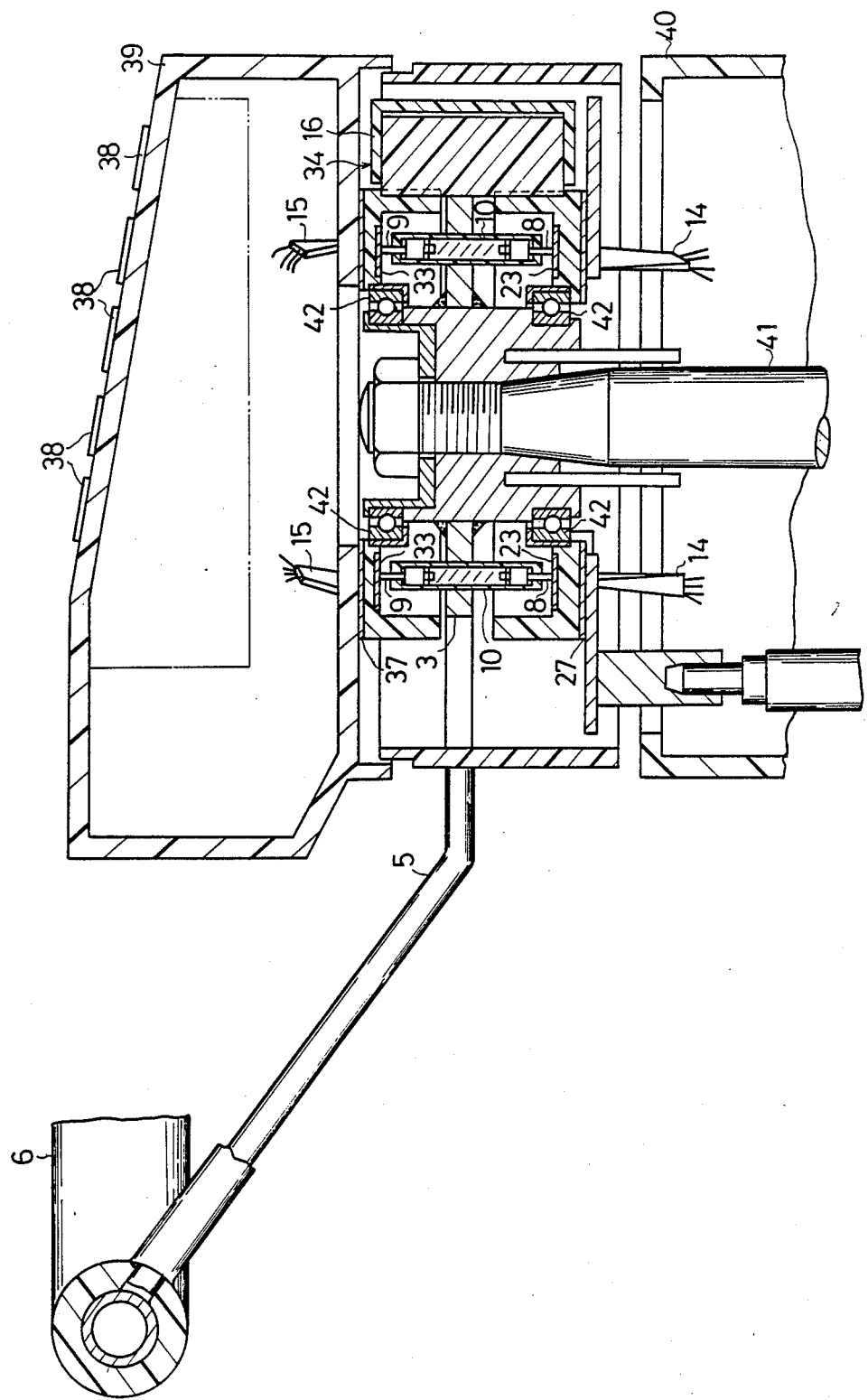

As shown in FIG. 1 and FIG. 2, a contact pin unit 12 is provided on the upper part of the boss portion 2. The contact pin unit 12 comprises column contact pins 8 and pad contact pins 9 that constitute pairs, with a conducting coil spring 43 between each pair, contact pin holders 10, which hold the contact pins 8, 9, and a contact pin mounting piece 11, having a shape of a flat doughnut, that holds the contact pin holders 10, such that the ends of the contact pins 8, 9 are arranged in one plane.

A pad sun gear 13 is pressingly attached to the upper part of the boss portion 2, with the bearings 42 in between. A pad portion 39 is fixed to the pad sun gear 13.

The structure of the pad sun gear 13, the pad segmented slip ring 33, and others are the same as those of the column sun gear 7, and others. In other words, the pad sun gear 13 comprises a wheel portion 31 and a rim portion 32. As in the column portion 40, pad segmented slip rings 33 are mounted on the inner surface of the wheel portion 31, and a printed circuit board 37 is mounted on a wheel portion outer surface 31b. Lead wires 15, coming from the connector 35 provided on the printed circuit board 37, extend through the pad portion, and are connected to various switches 38. By turning these switches 38 on or off, the electric device and others, mentioned earlier, are induced to operate or to stop operating. Thus, in this embodiment, between the electric devices and the switches 38, twelve signal circuits, through a relay mechanism with the following elements: column segmented slip rings 23 of the column sun gear 7—column contact pins 8—coilsprings 43—pad contact pins 9—pad segmented slip rings 33 of the pad sun gear 13, are formed. The steering shaft 1 is used as part of a common line 20 between the electric device and the switches 38.

Further, two planetary gears 17, 18 are disposed on the boss plate 3 via a bearing 16. One planetary gear 18, among the pair, comprises two gear sections 18a, 18b, a coil spring 18c, between these gear sections 18a, 18b, that pushes them away from each other, and a pair of coupling pieces 18d that regulate the interval between the gear sections 18a, 18b, such that it does not become less than a fixed amount. Therefore, even if the ring portion 6 is rotated, the planetary gears 17, 18, while rotating on their own axes, revolve around the irrotational column sun gear 7 connected to the column portion 40. In the same manner, the meshed pad sun gear 13 is kept at an irrotational state, like the column sun gear 7. One planetary gear 18 of the two planetary gears 17, 18 acts to prevent backrush of the planetary gear mechanism. This planetary gear 18 comprises the upper and a lower gear section 18a, 18b, coupling pieces 18d, and coil spring 18c provided around the coupling pieces 18d to make the gear sections 18a, 18b tend to move away from each other.

Figure 3:
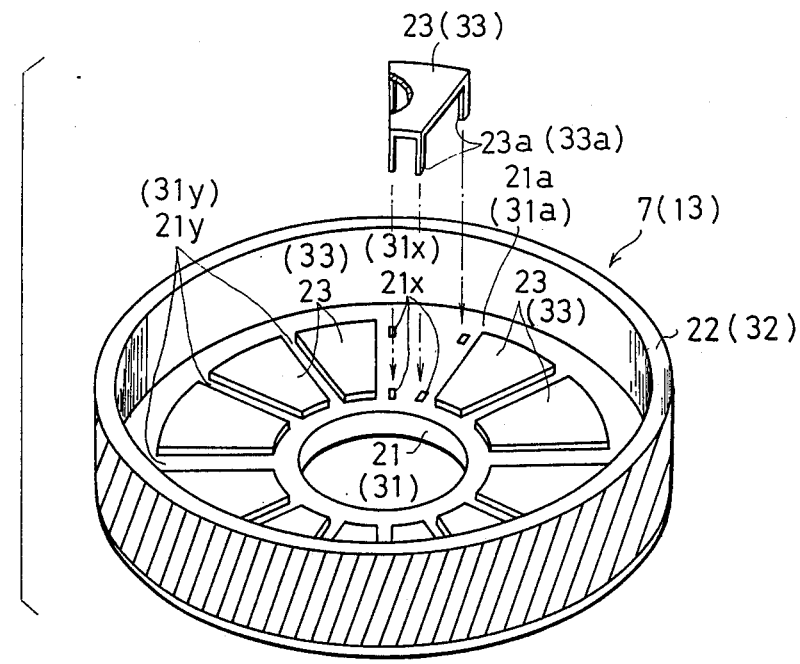
Figure 5:
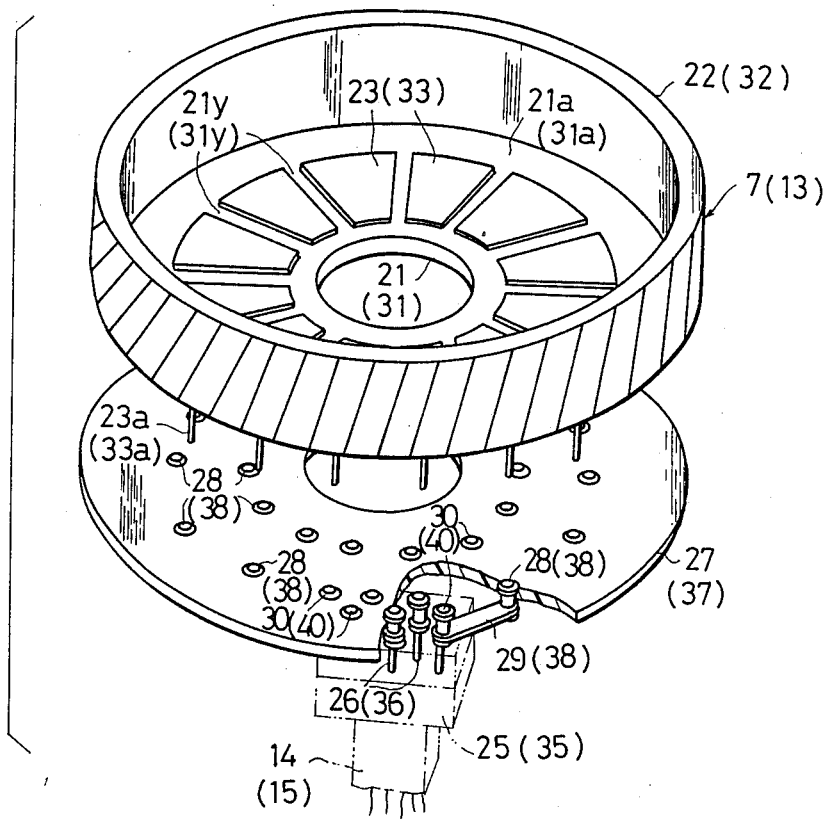
Figure 4:
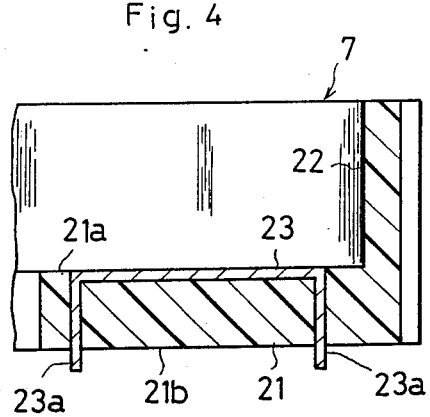
Figure 6:
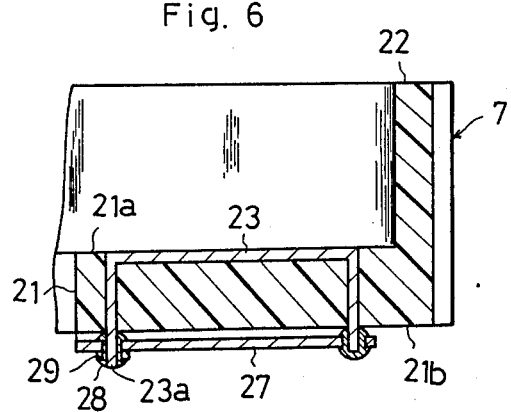

Next, the operation of the present embodiment is described and its effects are mentioned. In this embodiment, the electric device or actuator provided on the car body is electrically connected with the switches 38 provided on the pad portion 39 through the relay mechanism mentioned earlier. As a result, no special multiplex operation circuit is needed as compared with the related art. Further, the steering wheel of the present embodiment, that has the irrotational pad portion 39, is assembled according to known procedures. In this case, the column segmented slip rings 23 and the pad segmented slip rings 33 are mounted at fixed positions on the wheel portions 21, 31 of the column sun gear 7 and the pad sun gear 13, respectively, which are made of synthetic resin (FIG. 3 and FIG. 4). The legs 23a of the column and pad segmented slip rings 23, 33, that protrude from the wheel portion outer surface 21b, 31b, are inserted into the through-holes 28 on the printed circuit boards 27, 37. The tips of these legs 23a are soldered to the through-holes 28. Then, the connectors 25, 35 are attached by means of the pins 26, which are inserted into the wire connecting holes 30 and some of the through-holes 28 (FIG. 5 and FIG. 6).

Next, the column sun gear 7, formed according to the process mentioned earlier, is attached to the lower part of the boss portion 2, with the bearings 42 in between. The contact pin unit 12 is mounted on the boss plate 3 by inserting the contact pin holders 10 of the column contact pins 8 into the insertion holes 4 on the boss plate 3.

Further, after attaching the pad sun gear 13 to the upper part of the boss portion 2, with the bearings 42 in between, by engaging the planetary gears 17, 18, of the planetary gear unit 19, with the two sun gears 7, 13, these two sun gears 7, 13, on the upper and lower portions of the boss plate 3, become integrally assembled, thus forming the planetary gear mechanism.

In this way, in the present embodiment, just by attaching the column sun gear 7 and the pad sun gear 13 to the boss portion 2, all of the corresponding column contact pins 8 and the pad contact pins 9 become capable of making sliding contact, with uniform pressure, with the column segmented slip rings 23 and the pad segmented slip rings 33. Therefore, the process of adjusting the condition of sliding contact between the column slip ring and the column contact pins or the sliding contact between the pad slip ring and the pad contact pins by adjusting the mounting positions of the insulated base, is eliminated.

The following configurations can also be realized in this embodiment:

1. Slip rings consisting of a plurality of sections arranged in concentric circles can be used corresponding to the sun gears 7, 13, instead of the segmented slip rings 23, 33 of the present embodiment.

Figure 8:
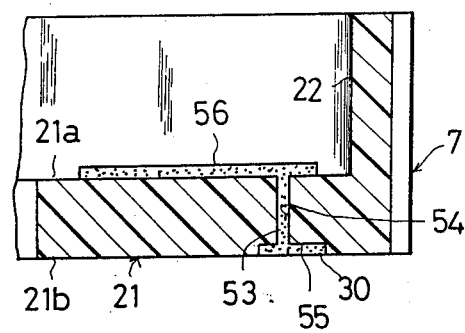
FIG. 8 to FIG. 10 are partial cross sectional views showing the process of manufacturing the segmented slip ring of FIG. 7, FIG. 11 to FIG. 13 show a second embodiment of the present invention.
Figure 9:
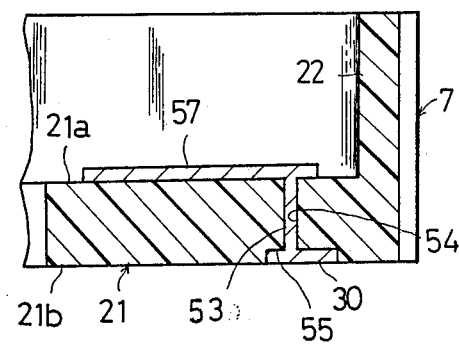
Figure 7:
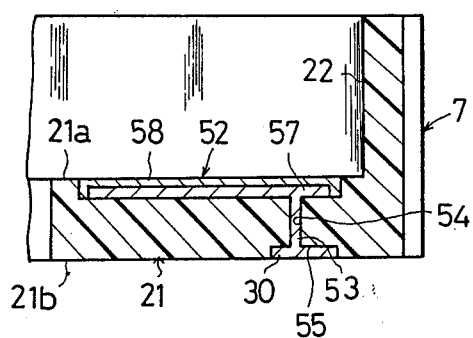
FIG. 7 is a partial cross sectional view showing another example of a segmented slip ring.
Figure 10:
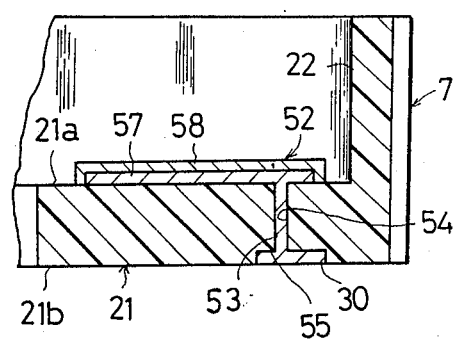

2. As shown in FIG. 7, wire connecting pieces 51, for connecting the pins 26, can be provided on the wheel portion outer surface 21b, without providing a printed circuit board. In this configuration, column and pad segmented slip rings 52 and connecting legs 53 can be formed by plating method. In other words, as shown in FIG. 8, perforations 54 and recessed portions 55, for forming the legs 53 and the wire connecting pieces 51, are formed on the wheel portions 21, 31 of the column sun gear 7 and the pad sun gear 13. A catalyst 56 is applied on these forming positions and on the forming positions of the column and pad segmented slip rings 52. Then, as shown in FIG. 9, a conductive plating 57 is formed by electroless plating with Cu, performed on the catalyst 56. Further, as shown in FIG. 10, the column and pad segmented slip rings 52 are formed by forming a hard plating 58 of Ni-B on the conductive plating 57. Finally, the column and pad segmented slip rings 52 are made flush with the wheel portion inner surface 21a, thus forming the column sun gear 7 and the pad sun gear 13, with the structure shown in FIG. 7.

A second embodiment of the present invention is described and compared to the first embodiment, with reference to FIG. 11 to FIG. 14. The present embodiment differs from the first embodiment mainly in the structure of the sun gear.

Figure 11:
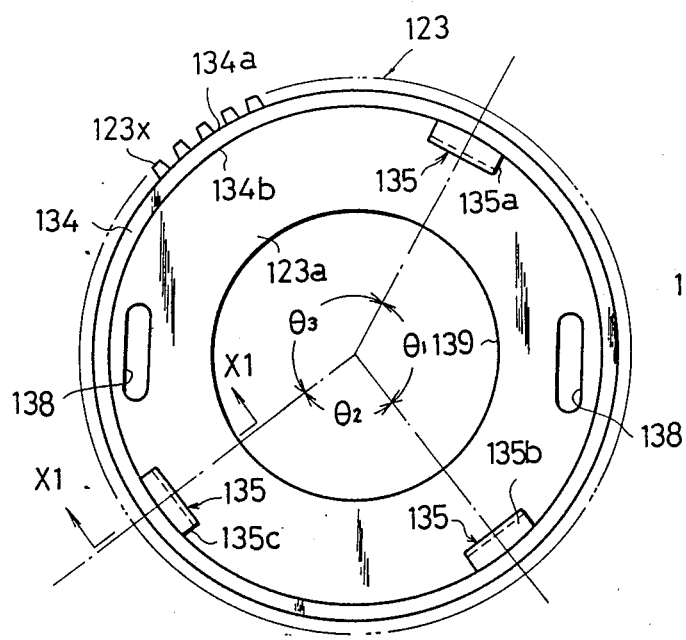
FIG. 11 is a plan view showing a sun gear.
Figure 12:
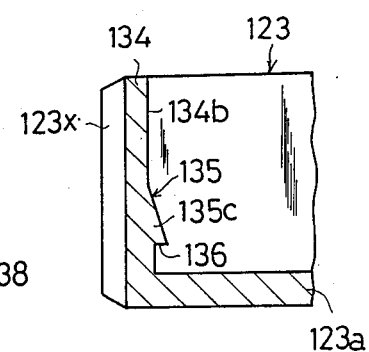
FIG. 12 is a cross sectional view along the line XII—XII in FIG. 11.
Figure 13:
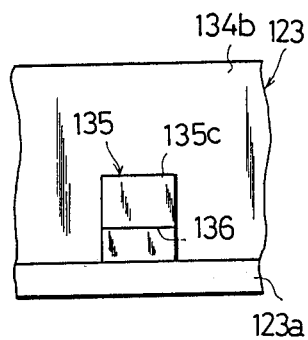
FIG. 13 is a partial plan view showing a first coupling portion.

As shown in FIG. 11 to FIG. 13, a column sun gear 123 comprises a wheel portion 123a, with a hole 139 in its center, and a rim portion 134 along the outer circumference of the wheel portion 123a. Helical teeth 123x are formed on an outer circumferential surface 134a of the rim portion 134. Further, three protruding portions or keys 135a, 135b, 135c, that make up a first engaging portion 135, are integrally formed on the rim portion 134, at unequal intervals along an inner circumferential surface 134b of the rim portion 134. In this embodiment, the angle θ1 between the pair of the neighboring keys 135a, 135b is 110 degrees, the angle θ2 between the keys 135b, 135c is 90 degrees, and the angle θ3 between the keys 135c, 135a is 160 degrees. Undercut portions 136, that act as securing means of a second engaging portion to be described later, are formed on the side of the keys 135a, 135b, 135c facing the wheel portion 123a.

Figure 14:
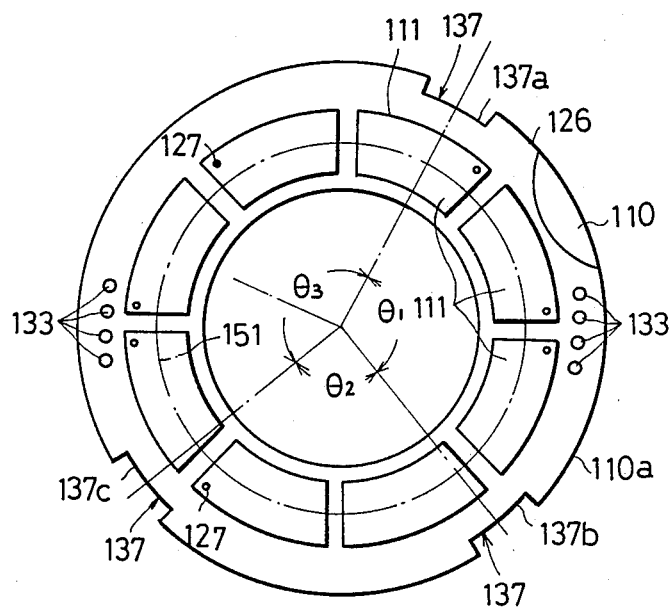
FIG. 14 is a plan view showing an insulated base.

As shown in FIG. 14, a plurality of segmented slip rings 111 are arranged along a circular sliding contact line 151, on an insulated base 110, that has the shape of a flat doughnut. The region of the insulated base 110 surrounding each of the segmented slip rings 111 is coated with a green resist layer 126. Each of the segmented slip rings 111 is electrically connected to wire connecting pieces 133 by means of through holes 127 and a wiring pattern (not shown) formed on the back side of the insulated base 110.

The insulated base 110 has an outer radius slightly smaller than the inner radius of the rim portion 134 of the column sun gear 123. Along an outer circumferential edge 110a of the insulated base 110, recessed portions or keyways 137a, 137b, 137c, that engage with the undercut portions 137, are formed at the positions corresponding to those of the keys 135a, 135b, 135c of the rim portion 134. These keyways 137a, 137b, 137c are wide enough to enable engagement with the keys 135a, 135b, 135c. Therefore, the angle $\theta 1$ between the pair of the neighboring keyways 137a, 137b is 110 degrees, the angle $\theta 2$ between the keyways 137b, 137c is 90 degrees, and the angle $\theta 3$ between the keyways 137c, 137a is 160 degrees.

Structures of a sun gear and an insulated base of the pad portion are the same as above. The column and pad segmented slip rings 111 are mutually connected, for example, by the contact pin unit 12 of the first embodiment.

The assembly process and operation of the embodiment constructed as above are described, and its effects are mentioned. In assembling the steering wheel of the present invention, the insulated base 110, with the integrally formed segmented slip ring 111, is inserted through the rim portion 134 of the column sun gear 123. When both 110, 123 are rotated relative to each other, since the keyways 137a, 137b, 137c of the insulated base 110 and the keys 135a, 135b, 135c of the column sun gear 123 are mutually arranged in their corresponding positions, and since they are positioned at unequal intervals, in the process of relative rotation, all the elements of the first engaging portion 135 engage with all the elements of the second engaging portion 137 at only one position. Thus, the insulated base 110 is accommodated and fixed at a fixed position inside the sun gear 123 without troublesome alignment required. Further, the undercut portions 136 formed on each key 135a, 135b, 135c locks the insulated portion 110 in place. Therefore, there is no slipping of the position of the insulated base 110 inside the sun gear 123.

In the same manner, the insulated base is attached to the sun gear of the pad portion. Both sun gears 123 are attached to the outer circumference of the steering shaft 1, with a bearing and a bearing plate in between, such that the segmented slip rings 111 in each assemblage are set facing each other. Then, the planetary gear mechanism of the present embodiment, is completed by meshing the planetary gears 17, 18 to both sun gears 123. When adjusting the position of rotation of both sun gears 123, such that the segmented slip rings 111 are set facing each other, for example, marks, or others, made on each of the sun gears 123 can be used such that they are set facing each other with certainty. In this way, in the present embodiment, in the process of assembling the planetary gear mechanism, alignment of the positions of the insulated bases 110 is not required, resulting in an improvement in operation efficiency.

In the steering wheel assembled according to the procedure just described, the first engaging portion 135 and the second engaging portion 137 completely prevent the insulated base 110 from slipping in the direction of the circular sliding contact line 151 on the corresponding sun gear 123. As a result, during the steering operation, slipping of the two segmented slip ring 111 assemblages in the direction of rotation of the steering wheel is likewise prevented.

Figure 15:
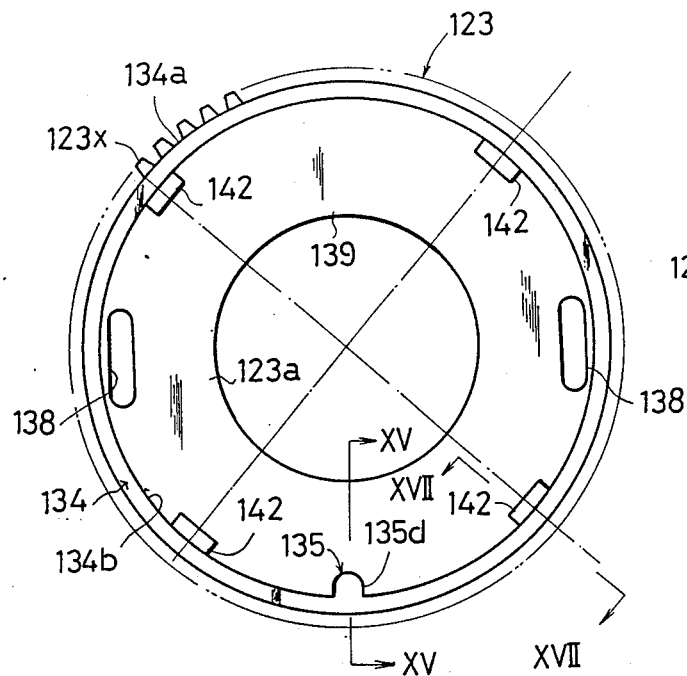
FIG. 15 is a plan view showing another example of a sun gear.
Figure 16:
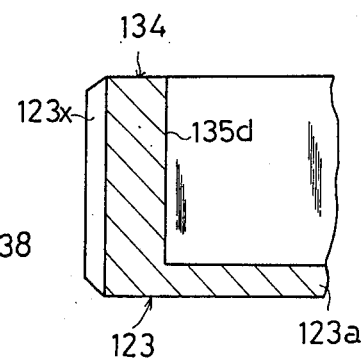
FIG. 16 is a cross sectional view along the line XVI—XVI in FIG. 15.
Figure 17:
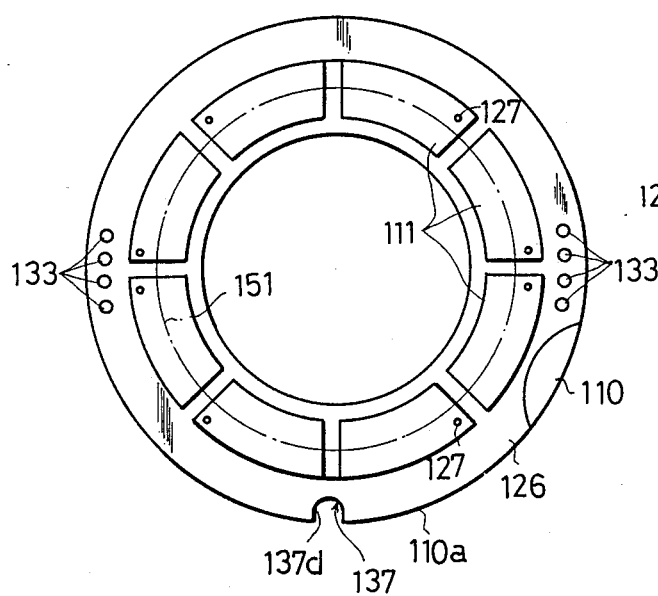
FIG. 17 is a plan view showing an insulated base, that is disposed inside the sun gear of FIG. 16.
Figure 18:
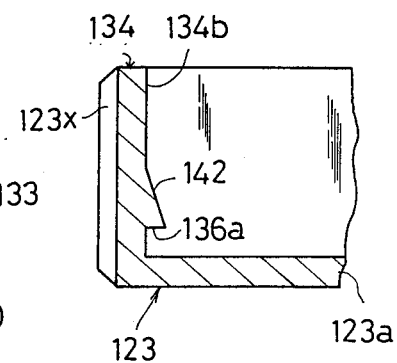
FIG. 18 is a cross sectional view along the line XVIII—XVIII in FIG. 16.

The present embodiment can be modified, as in the following examples:

(1) As shown in FIG. 14 and FIG. 15, a key 135d is integrally formed on the inner circumferential surface 134b of the rim portion 134 of the column sun gear 123, as the first engaging portion 135. On the other hand, as shown in FIG. 17, a keyway 137d, that engages with the key 135d, is formed on the outer circumferential edge 110a of the insulated base 110, as the second engaging portion 137. Similarly, alignment of the position of the insulated base 110 inside the sun gear 123 can also be done with both engaging portions 135, 137. In this modification, however, the insulated base 110 can also be made to engage with the column sun gear 123 by providing protruding portions 142, with undercut portions 136a, as shown in FIG. 18, on the inner circumferential surface 134b of the rim portion 134, at equal intervals along the circumference of the rim portion 134, as shown in FIG. 15. The protruding portions 142 can also be provided along the circumference of the rim portion 134 at unequal intervals.

Figure 19:
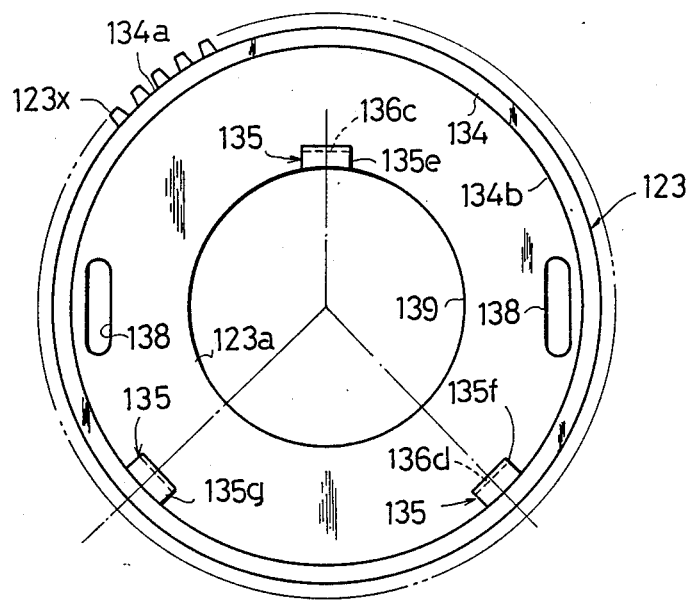
FIG. 19 is a plan view showing another example of a sun gear.
Figure 20:
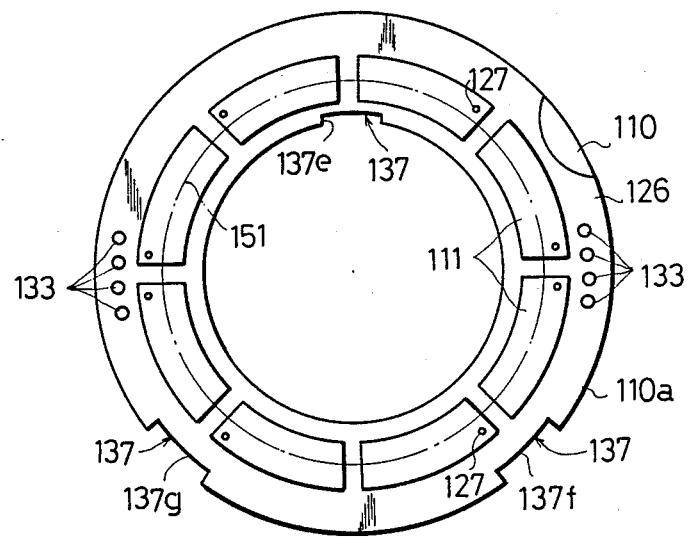
FIG. 20 is a plan view showing an insulated base, that is disposed inside the sun gear of FIG. 19.

(2) In the column sun gear 123, the insulated base 110 can be disposed in a fixed position inside the sun gear 123 by providing one key 135e among three keys 135e, 135f, 135g making up the first engaging portion, on the hole 139 of the wheel portion 123a, and the other keys 135f, 135g on the rim portion 134, as shown in FIG. 19. In this modification, a keyway 137e that engages with the key 135e, is formed on the inner circumferential edge of the insulated base 110, and other keyways 137f, 137g, which, together with the keyway 137e make up the second engaging portion of the insulated base 110, are formed on the outer circumferential edge 110a of the insulated base 110, as shown in FIG. 20. Further, undercut portions 136c, 136d, making up the securing means, are formed on each of the keys 135e, 135f, 135g.

Figure 21:
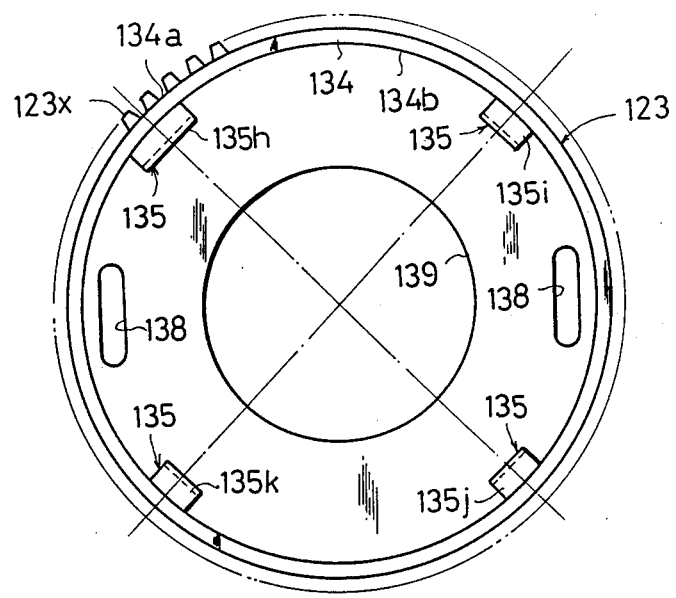
FIG. 21 is a plan view showing another example of a sun gear.
Figure 22:
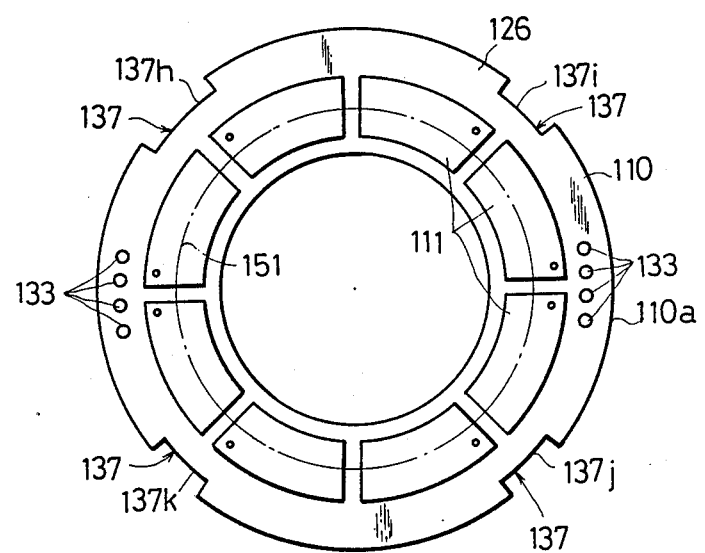
FIG. 22 is a plan view showing an insulated base, that is disposed inside the sun gear of FIG. 21.

(3) As shown in FIG. 21, the insulated base 110 can also be disposed in a fixed position inside the sun gear 123 by providing four keys 135h, 135i, 135j, 135k at the equal intervals on the inner circumferential surface 134b of the rim portion 134, with one of the keys, 135h, making up the first engaging portion 135, made wider than the other keys 135i, 135j, 135k. In this modification, a keyway 137h, that makes up the second engaging portion 137 and engages with the key 135h, is made wider than other keyways 137i, 137j, 137k, as shown in FIG. 22. The key 135h and the keyway 137h can also be made narrower than the other keys 135i, 135j, 135k and keyways 137i, 137j, 137k, respectively.

Figure 23:
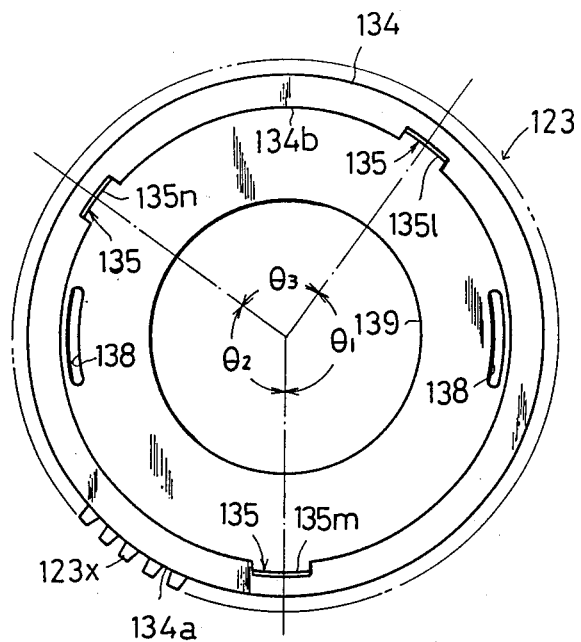
FIG. 23 is another example of a sun gear.
Figure 24:
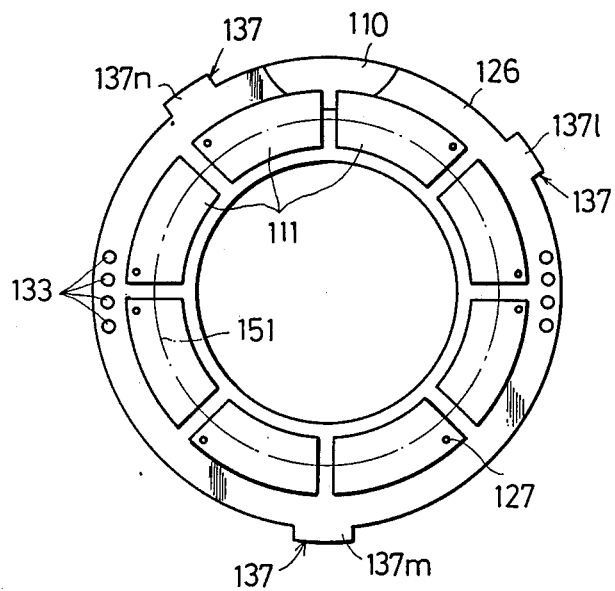
FIG. 24 is a plan view showing an insulated base, that is disposed inside the sun gear of FIG. 23.

(4) As shown in FIG. 23, keyways 135l, 135m, 135n, that make up the first engaging portion 135, can be formed at unequal intervals on the inner circumferential surface 134b of the rim portion 134 of the column sun gear 123, and keys 137i, 137j, 137k, that make up the second engaging portion 137 and engage with the keyways 135l, 135m, 135n, can be formed on the insulated base 110, as shown in FIG. 24.

Figure 25:
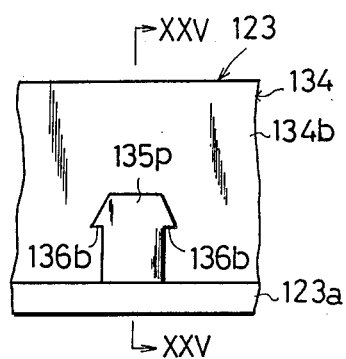
FIG. 25 is a partial side view showing another example of a first coupling portion.
Figure 26:
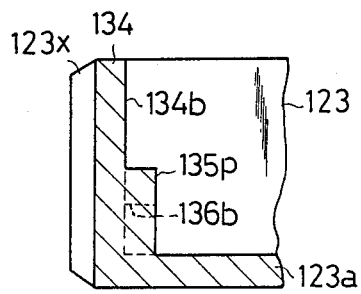
FIG. 26 is a partial cross sectional view of the same.

(5) As shown in FIG. 25 and FIG. 26, undercut portions 136b of a key 135p, formed on the inner circumferential surface 134b of the rim portion 134, can also be formed on both sides of the key 135p on the inner circumferential surface 134b. These undercut portions 136 make up the first engaging portion 135.

(6) Needless to say, the various modifications mentioned above can also be applied to the pad sun gear.

Next, the third embodiment of the present invention is described with reference to FIG. 27 and FIG. 28. The present embodiment differs from the first and second embodiments with respect to the structure of the contact pin unit.

A contact pin unit 211 is provided on the upper part of a boss plate 203. This contact pin unit 211 comprises column contact pins 212 and pad contact pins 213, serving as contact pieces, that constitute pairs with a coil spring 234 between them, upper and lower contact pin holders 231, 232, that hold the pairs of upper and lower contact pins 212, 213, and a contact pin mounting piece 215, on which the upper and lower contact pin holders 231, 232 are protrudingly mounted, such that the tips of the two assemblages of contact pins 212, 213 are arranged in one plane, respectively.

Figure 27:
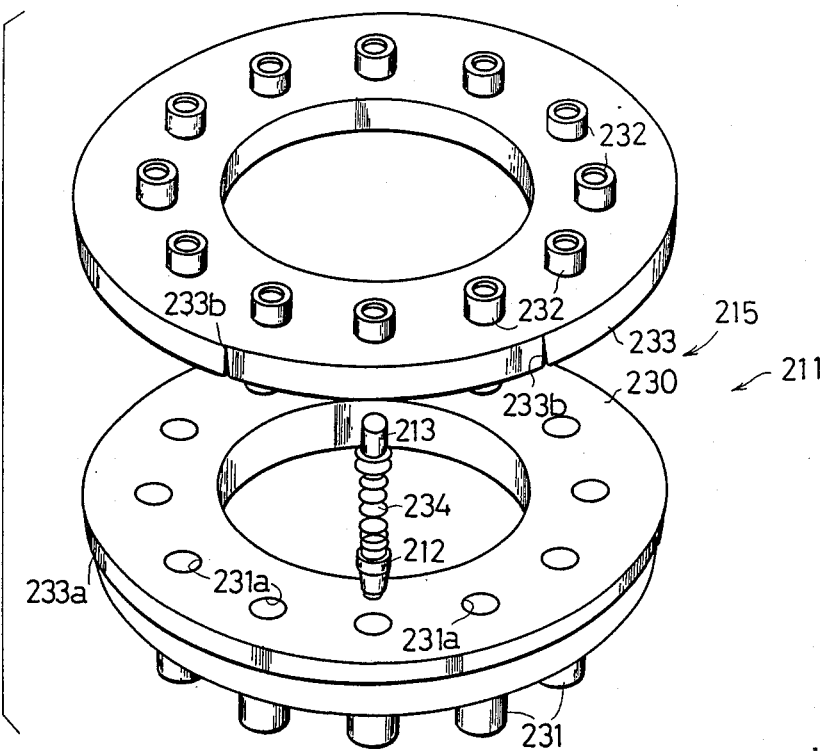
FIG. 27 and FIG. 28 show a third embodiment of the present invention.
Figure 28:
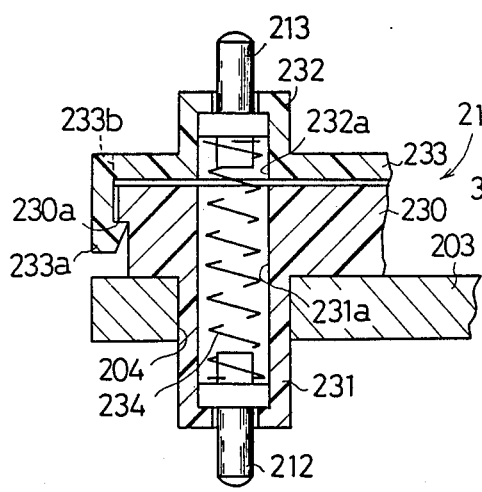

As shown in FIG. 27 and FIG. 28, the contact pin mounting piece 215 comprises a lower body 230, having the shape of a flat doughnut, where the lower contact pin holders 231, that hold the column contact pins 212, are arranged in a circle at fixed positions at fixed intervals, and an upper body 233, that holds the upper contact pin holders 232 at the positions corresponding to those of the lower contact pin holders 231.

Pin insertion holes 231a, 232a are provided on the lower body 230 and the upper body 233 at the positions corresponding to those of the contact pin holders 231, 232.

An undercut portion 230a as engaging means is formed throughout the outer circumference of the lower body 230. A locking portion 233a, that engages with the undercut portion 230a to unite the upper and lower bodies 233, 230, is formed throughout the outer circumference of the upper body 233.

A plurality of gaps 233b are provided, as needed, at appropriate intervals along the circumference of the upper body 233, to enable the upper body 233 to be separated from the lower body 230.

The lower contact pin holders 231, protruding downward from the lower body 230, are inserted into locking holes 204 on the boss plate 203. Thus, the contact pin unit 211 rotates with the boss plate 203 during the steering operation.

In the present embodiment, the number of the column and pad segmented slip rings is eight each; the column contact pins 212 and pad contact pins 213 are twelve each.

Next, the operation of the present embodiment is described and its effects are mentioned. In assembling the steering wheel of the present embodiment, that has an irrotational pad portion, according to known procedures, the column contact pins 212 and the pad contact pins 213, that are connected by coil springs 234, are inserted inside the pin insertion holes 231a on the lower body 230, that is made of synthetic resin.

The contact pin unit 211 is constructed by superposing the upper body 233, that is made of synthetic resin, on the lower body 230, making the tips of the pad contact pins 213 protrude from the upper contact pin holders 232, as well as making the locking portion 233a of the upper body 233 engage with the undercut portion 230a of the lower body 230.

Then, the lower contact pin holders 231 are inserted into the locking holes 204 on the boss plate 203 and fixed on the boss plate 203 by means of thermal caulking or others. As a result, the contact pin unit 211 becomes locked to the boss plate 203 by means of the contact pin holders 231, and the column contact pins 212 and the pad contact pins 213 also become attached to the boss plate 203.

The lower contact pin holders 231 and the upper contact pin holders 232 are integrally formed with the lower body 230 and the upper body 233, respectively, and the upper and lower bodies 230, 233 are coupled throughout their circumferences, by means of the undercut portion 230a and the locking portion 233a. Thus, the lower body 230 and the upper body 233 are prevented from curving and coming off due to warping thereof during forming or to the restoring force of the coil spring 234. As a result, the tips of the column contact pins 212 and pad contact pins 213 are always arranged in one plane, respectively. Thus, in the present embodiment, attaching the contact pin unit 211 is very easy and the tips of the column contact pins 212 and pad contact pins 213 can be accurately arranged at fixed positions. Consequently, the force of sliding contact of the column contact pins 212 and the pad contact pins 213 on the column segmented slip ring and the pad segmented slip ring, respectively, becomes uniform, diminishing wear, as well as enabling the improvement of the relay capabilities of both parts.

Figure 29:
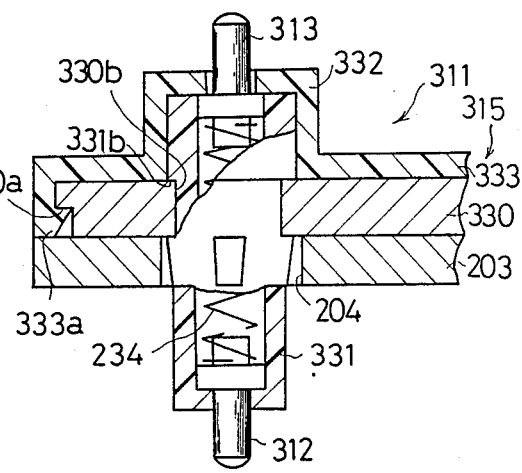
FIG. 29 is a partial cross sectional view showing another example of a contact pin unit.

A modification of the third embodiment is described, with reference to FIG. 29.

In the contact pin unit 311 of this modification, a lower body 330 is made of aluminum plate. Contact pin holders 331, that hold column and pad contact pins 312, 313, are made of synthetic resin, and are formed as pieces separate from the lower body 330. Holder insertion holes 330b are perforated on the lower body 330 at the positions where the column contact pins 312 and pad contact pins 313 are to be disposed. The contact pin holders 331 are mounted in the holder insertion holes 330b by means of locking portions 331b, formed in the center along the outer circumference of the contact pin holders 331, locking with the inner circumferential edge of the holder insertion holes 330b.

An upper body 333 is attached to the lower body 330, in the same manner as in the third embodiment. This upper body 333 has a cover 332, that covers the contact pin holders 331 protruding from the lower body 330, and a locking portion 333a that locks with an undercut portion 330a as engaging means of the lower body 330. The column and pad contact pins 312, 313 are inserted into the contact pin holders 331, from the side where the cover 332 is provided, and are prevented from coming off the contact pin holders 331 by the cover 332.

In this modification, since the lower body 330 is made of aluminum plate, even if the upper body 333, that is made of synthetic resin, is deformed in the direction of its thickness due to various causes, the lower body 330 will correct any deformation of the upper body 333, because the two bodies 330, 333 are integrally locked. Thus, the possibility of the deformation of the entire unit is small compared to the case where the upper and lower bodies of the contact pin mounting piece are made of synthetic resin; consequently, it is reliable, in that, the tips of the column contact pins 312 and pad contact pins 313 are accurately arranged in one plane, respectively.

The third embodiment can also be modified as follows:

(1) As shown in FIG. 30, contact pin holders 531, protruding upward from a contact pin mounting piece 515, can be kept open at their upper tips to allow the reception of contact pins 512, 513, or others, or the same contact pin holders 513 can be covered with a cover 532 made of an insulating material such as synthetic resin, rubber, and others. In this modification, the outer circumference of the upper end of the contact pin holders 531 is formed with an undercut portion 531b, which locks with a locking portion 532a formed on the cover 532. The modification exhibits the same effects similar to those of the first embodiment, except for the locking capability of the cover 532. Further, even when there is a change in the design of the contact pin mounting piece 515, for example, a change in the number of the contact pin holders 531, the covers 532 can be used as they are.

(2) The configuration of the contact pin mounting piece 215, 315, 515 can have various configurations as long as it can hold the contact pin holders 231, 232, 331, 531, and as long as the tips of the column and the pad contact pins 212, 213, 312, 313, 512, 513 can be arranged in one plane, respectively.

(3) In the third embodiment, the undercut portion 230a and the locking portion 233a can be provided along the inner circumference or along both the inner and outer circumferences of the contact pin mounting piece 215.

Figure 33:
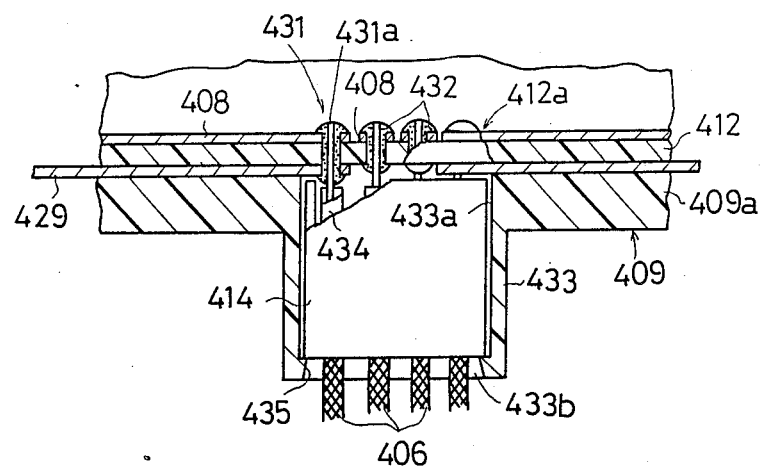

Next, the fourth embodiment of the present invention is described and compared to the second embodiment with reference to FIG. 31 to FIG. 33. The fourth embodiment differs from the second embodiment mainly in the structure of the connector and adjoining parts.

A bearing plate 407, made of synthetic resin such as polyamide resin, polyacetal resin, and others, is attached to the boss portion, concentric to its outer circumference, with a bearing (not shown) in between.

The column sun gear 409 made of synthetic resin is attached to the upper surface of the bearing plate 407 by fixing its wheel portion 409a to a collar portion 407a of the bearing plate 407. A rim portion 409b meshes with a planetary gear 428.

On the region near the lower circumferential edge of the wheel portion 409a, a connector receiving piece 433, that has the shape of a rectangular cylinder, is made integrally with the same wheel portion 409a. A connector 414, of column signal wires 406 extending from the column portion, is adaptable to insertion into the connector receiving piece 433.

An inner opening 433a, to which the connector 414 can be inserted, is formed on the wheel portion 409a on the part corresponding to that where the connector receiving piece 433 is mounted. Pins 431a, to be described later, provided on a column insulated base 412, jut out from this inner opening 433a.

Locking hooks 435 are formed on an outer opening 433b of the connector receiving piece 433 to prevent the connector 414 from easily coming off, once the connector 414 is inserted into the connector receiving piece 433.

As shown in FIG. 32, the column insulated base 412, that has the shape of a flat doughnut, is fixed to the collar portion 407a, on the upper surface of the wheel portion 409a. Eight fan-like segmented slip rings 408 are mounted at fixed intervals in a circular shape on the column insulated base 412. Long and narrow wiring patterns 429, with one end of each being electrically connected to the column segmented slip rings 408 by means of slip ring through holes 430, are provided on the lower surface of the column insulated base 412. The other end of the each wiring pattern 429 is concentrated at a pin mounting portion 412a provided on the outer portion of the column insulated base 412, each end being connected to a corresponding pattern through hole 432. The slip ring through holes 430 on the pin mounting portion 412a, are also used as pattern through holes.

As shown in FIG. 33, the pins 431a, used as wire connecting pieces 431, are provided by means of soldering or others on the pattern through holes 432. The pins 431a are inserted into pin insertion portions 434 of the connector 414, when the connector 414 is inserted into the connector receiving piece 433.

The structure of the adjoining regions of the pad sun gear is exactly the same as that of the column portion.

Next, the operation of the present embodiment is described and its effects are mentioned. The column and pad sun gear 409 and the column and pad insulated bases 412 mounted with the column and pad segmented slip rings 408, respectively, are fixed to the collar portion 407a of the bearing plate 407. This is done in such a way that the pins 431a, provided on each insulated base 412, jut out from the inner opening 433a of the connector receiving piece 433.

Afterward, the contact pin unit, both sun gears 409, and the planetary gears 428 are mounted on the boss portion to complete the planetary gear mechanism. Then, the connectors 414 of the column and pad signal wires 406 are inserted into the connector receiving pieces 433 of the column and pad sun gears 409.

The pins 431a of the column and pad insulated bases 412 are then inserted into the pin insertion portions 434 of the connectors 414, and, at the same time, the connectors 414 lock with the locking hooks 435, and, as long as the locking hooks 435 are not unlocked, the connectors 414 will not come off the connector receiving pieces 433.

Further, the column and pad segmented slip rings 408 are electrically connected to the column and pad signal wires 406 by means of the wiring patterns 429, pattern through-holes 432, pins 431a, and connectors 414, just by inserting the connectors 414 into the connector receiving pieces 433.

As stated above, in the present embodiment, since the column and pad signal wires 406 are electrically connected to the column and pad segmented slip rings 408 after the planetary gear mechanism is assembled, efficiency in assembling the planetary gear mechanism is improved.

Figure 34:
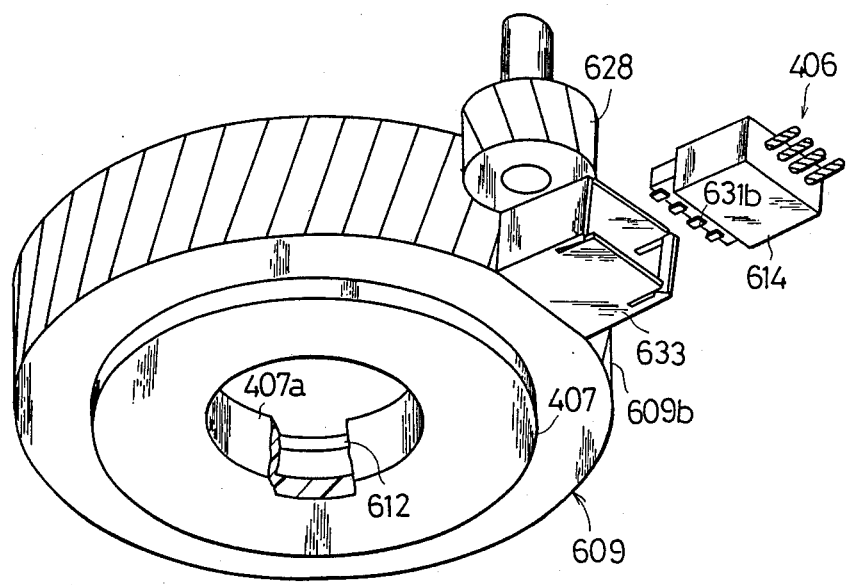
FIG. 34 is an exploded perspective view showing another configuration of a part along the circumference of a sun gear.
Figure 35:
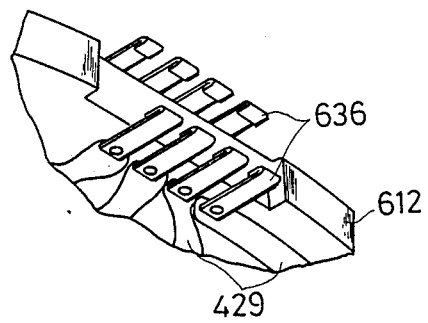
FIG. 35 is a partial perspective view showing contact elements.
Figure 36:
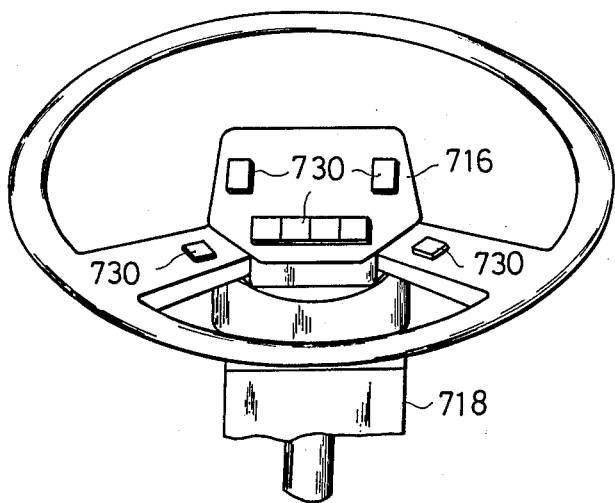
FIG. 36 is a perspective view showing a steering wheel of a related art.

The present embodiment can also be realized in the following modifications:

(1) As shown in FIG. 34 and FIG. 35, a connector receiving piece 633 can be mounted on a rim portion 609b of column and pad sun gears 609. In this modification, the connector receiving piece 633 must be of a size which does not cause it to be a hindrance and it must be placed in a position where it does not interfere with the rotation and revolution of a planetary gear 628. Further, since the pins used as lead wire connecting pieces cannot be placed on the outer circumference of column and pad insulated bases 612, two sets of connecting elements 636 are fixed, opposite each other, on the upper and lower surfaces of the column and pad insulated bases 612, respectively, as shown in FIG. 35. Connecting elements 631b, adapted to coupling with the connecting elements 636, are provided in the connector 614, that is inserted into the connector receiving piece 633.

(2) A multiple slip ring, arranged in concentric circles on the column and pad insulated bases 412, can be used instead of the column and pad segmented slip rings 408 of the present embodiment.

(3) The column and pad sun gears 409, 609 can be directly attached to the boss portion without using the bearing plate 407.

(4) The wire connecting pieces 431 can be made into pin insertion portions, and the pins can be provided on the connector 414.

(5) It is desirable to determine the configuration of the connector 414 and the connector receiving piece 433, such that both are coupled only at one part during rotation, to prevent entanglement of wires.

Inasmuch as it is obvious that the present invention can be constructed and applied in a wide range of realizations, without departing from its spirit and scope, the embodiments of the present invention are not limited to specific embodiments except as defined in the appended claims.

What is claimed is:

1. A steering wheel comprising:
   a pair of sun gears arranged facing each other, each sun gear comprising a wheel portion having an inner surface and a rim portion protruding along an outer circumference of said wheel portion,
   at least two segmented slip rings mounted on said inner surface of said each wheel portion, each segmented slip ring having a leg and said each sun gear having a hole for inserting said leg, said segmented slip ring being mounted on said sun gear by inserting said leg into said hole;
   contact pins, in sliding contact with said segmented slip rings on said each wheel portion, provided between said pair of sun gears; and
   a printed circuit board mounted on an outer surface of said wheel portion, said printed circuit board having a through hole, for inserting said leg of said segmented slip ring, provided at a position corresponding to that of said hole on said wheel portion, and a wire connecting hole electrically connected to said through hole.

2. A steering wheel comprising:
   a pair of sun gears arranged facing each other, each sun gear comprising a wheel portion having an inner surface and a rim portion protruding along an outer circumference of said wheel portion,
   at least two segmented slip rings mounted on said inner surface of said each wheel portion, said segmented slip ring being a plating formed on said inner surface of said wheel portion; and
   contact pins, in sliding contact with said segmented slip rings on said each wheel portion, provided between said pair of sun gears.

3. A steering wheel, as set forth in claim 2, in which said plating comprises a conductive plating formed on said inner surface of said wheel portion and a hard plating formed on said conductive plating.

4. A steering wheel, as set forth in claim 2, further including wire connecting portions provided on an outer surface of said wheel portion, said wheel portion having perforations at positions corresponding to said each slip ring, said each slip ring being disposed inside said each perforation and having a leg electrically connected to said wire connecting portion.

5. A steering wheel comprising:
   first and second sun gears, each having an inner surface, disposed such that said inner surfaces are set facing each other,
   first and second insulated bases, each having a shape of a substantially circular plate, mounted on said inner surface of said first and second sun gears, respectively,
   first and second assemblies of segmented slip rings mounted at equal intervals in a circle on said first and second insulated bases, respectively,
   a plurality of contact pieces, provided between said first and second assemblies, making sliding contact with said both assemblies of said segmented slip rings, and electrically connecting said first assembly of said segmented slip rings with said second assembly of said segmented slip rings,
   first engaging means provided on said inner surface of each of said sun gears, and
   second engaging means provided on each of said insulated bases on a position corresponding to that of said first engaging means and engaging with said first engaging means so as to determine a position of said each insulated base inside said each sun gear.

6. A steering wheel, as set forth is claim 5, in which said each sun gear has on said inner surface securing means for preventing said insulated base from coming off said sun gear.

7. A steering wheel, as set forth in claim 5, in which said sun gear comprises a wheel portion and a rim portion protruding from an outer circumference of said wheel portion, said first engaging means is made up of a protruding portion provided on a boundary of said wheel portion and rim portion, and said second engaging means is made up of a recessed portion formed along an outer circumferential edge of said insulated base, and engaging with said protruding portion.

8. A steering wheel, as set forth in claim 7, in which said protruding portion and said recessed portion are provided, at least three each, at unequal intervals along said outer circumference of said wheel portion.

9. A steering wheel, as set forth in claim 7, in which said sun gear further has securing means for preventing said insulated base from coming off said sun gear.

10. A steering wheel, as set forth in claim 9, in which said securing means is made up of an undercut portion formed on a side of said wheel portion of said protruding portion, and engaging with said outer circumferential edge of said insulated base.

11. A steering wheel, as set forth in claim 9, in which said securing means is made up of a second protruding portion provided on said rim portion, said second protruding portion having an undercut portion formed on a side of said wheel portion, and engaging with said outer circumferential edge of said insulated base.

12. A steering wheel, as set forth in claim 5, in which:
   said sun gear comprises a wheel portion having a hole in its center and a rim portion protruding along an outer circumference of said wheel portion,
   said insulated base has approximately a same planar configuration as said wheel portion with a hole on its center,
   said first engaging portion comprises a first protruding portion provided on a boundary of said wheel portion and said rim portion and a second protruding portion provided on said hole of said wheel portion, and
   said second engaging means comprises a first recessed portion provided on an outer circumferential edge of said insulated base, and engaging with said first protruding portion, and a second recessed portion provided on said hole of said insulated base, and engaging with said second protruding portion.

13. A steering wheel, as set forth in claim 12, in which said first and second protruding portions have undercut portions formed on a side of said wheel portion, and engaging with said outer circumferential edge of said insulated base, as securing means to prevent said insulated base from coming off said sun gear.

14. A steering wheel, as set forth in claim 5, in which:
said sun gear comprises a wheel portion and a rim portion protruding along an outer circumference of said wheel portion,
said first engaging means comprises a first protruding portion and a second protruding portion having a configuration different from that of said first protruding portion, said first and second protruding portions being provided on a boundary of said wheel portion and said rim portion, and
said second engaging means comprises a first recessed portion, having a shape adapted to engaging with said first protruding portion only, and a second recessed portion, having a shape adapted to engage with said second protruding portion only, said first and second recessed portions being provided on an outer circumferential edge of said insulated base.

15. A steering wheel, as set forth in claim 5, in which:
said sun gear comprises a wheel portion and a rim portion protruding along an outer circumference of said wheel portion,
said first engaging means comprises a recessed portion provided on a boundary of said wheel portion and said rim portion, and
said second engaging means comprises a protruding portion, adapted to engage with said recessed portion, provided on an outer circumferential edge of said insulated base.

16. A steering wheel, as set forth in claim 5, in which said contact pieces comprise first contact pins in sliding contact with said first assembly of said segmented slip rings, and second contact pins in sliding contact with said second assembly of said segmented slip rings, said steering wheel further having a contact pin mounting piece for holding said first and second contact pins such that tips of said first contact pins and second contact pins are arranged in one plane, respectively.

17. A steering wheel, as set forth in claim 16, in which said contact pin mounting piece comprises holders for holding said contact pieces, said contact pins being
put in and taken out from one end of said holders, and a covering piece, disposed over said ends of said holders and engaging with one of said first and second contact pins inside said holders to prevent said contact pins from coming off said holders.

18. A steering wheel, as set forth in claim 16, in which said contact pin mounting piece comprises a first body holding said first contact pins, and a second body holding said second contact pins, said first body having first engaging means on its outer circumferential edge, said second body having on its outer circumferential edge second engaging means engaging with said first engaging means and coupling said both bodies throughout at their perimeters.

19. A steering wheel, as set forth in claim 18, in which said first engaging means is an undercut portion extending as a flange from said outer circumferential edge of said first body, and said second engaging means is a locking portion formed on said outer circumferential edge of said second body, and engaging with said undercut portion.

20. A steering wheel, as set forth in claim 16, in which said contact pin mounting piece comprises holders for holding said contact pieces, said contact pins being
put in and taken out from one end of said holders, a first body, made of metal, for accommodating said holders, and a second body covering a side of said holders where said ends of said holders are located and also engaging with one of said first and second contact pins inside said holders to prevent said contact pins from coming off said holders.

21. A steering wheel, as set forth in claim 20, in which said first body has first engaging means on its outer circumferential edge and said second body has on its outer circumferential edge second engaging means engaging with said first engaging means, and coupling both bodies throughout their perimeters.

22. A steering wheel, as set forth in claim 5, in which:
said insulated base has a mounting portion on an outer circumference of a surface thereof facing said inner surface of said sun gear and wire connecting pieces electrically connected to said segmented slip rings and concentrated on said mounting portion,
said sun gear has a box-like connector receiving piece protruding outward from a part corresponding to said mounting portion, said wire connecting pieces being exposed inside said connector receiving piece, and
said steering wheel further has a connector, connected to signal wires and adapted to be inserted into and taken out from said connector receiving piece, connecting said slip rings to said signal wires.

23. A steering wheel, as set forth in claim 22, in which said sun gear comprises a wheel portion having an inner surface for mounting said insulated base, and a rim portion protruding along an outer circumference of said wheel portion, said connector receiving piece being formed on an outer surface of said wheel portion.

24. A steering wheel, as set forth in claim 22, in which said sun gear comprises a wheel portion having an inner surface for mounting said insulated base, and a rim portion protruding along an outer circumference of said wheel portion, said connector receiving piece being formed on an outer surface of said rim portion.

* * * * *